United States Patent Office 3,311,629
Patented Mar. 28, 1967

3,311,629
9b - ARYL - 1,2,3,9b - TETRAHYDRO - 5H - IMIDAZO[1,2 - a]PYRIDO[3,2 - c]PYRROL - 5 - ONES AND RELATED COMPOUNDS
Theodore S. Sulkowski, Narberth, Pa., assignor to American Home Products Corporation, New York, N.Y., a corporation of Delaware
No Drawing. Filed Feb. 1, 1966, Ser. No. 523,955
10 Claims. (Cl. 260—256.4)

This is a continuation-in-part of application Ser. No. 336,625, filed on Jan. 9, 1964, and now abandoned.

This invention relates to compositions of matter classified in the art of chemistry as imidazopyridopyrrolones, pyrimidopyridopyrrolones and pyridopyrrolobenzimidazolones.

The compounds within the scope of the present invention include those having a molecular structure in which there is attached to the 9b-position of 1,2,3,9b-tetrahydro - 5H-imidazo[1,2-a]pyrido[3,2-c]pyrrol-5-one nucleus, the p-chlorophenyl group and its hereinafter disclosed equivalents. Further, the compounds within the purview of this invention include those having molecular structures in which there is attached to the 10b-position of the 1,2,3,4,6,10b-hexahydropyrimido[1,2-a]pyrido[3,2-c]-pyrrol-6(2H)-one nucleus and to the 4b-position of the 4b,5 - dihydro-11H-pyrido[3′,2′:3,4]pyrrolo[1,2-a]benzimidazol-11-one nucleus a p-chlorophenyl group and equivalents thereof.

The compounds of the present invention possess the general physical properties of being high melting crystalline solids and being substantially insoluble in water but soluble in polar solvents, such as, lower aliphatic alcohols. Examination of the compounds produced according to the hereinafter disclosed process reveals, upon ultraviolet and infrared spectrographic analysis, spectral data confirming the molecular structures hereinbefore set forth. Thus, the frequencies of the nitrogen to hydrogen bonds and of the carbonyl groups are evident in the appropriate infrared spectra. The aforementioned physical characteristics taken together with the nature of the starting materials and the mode of synthesis positively confirm the structure of the claimed compounds.

The manner and process of making the compounds of the present invention will be hereinafter generally described so as to enable a person skilled in the art of chemistry to make and use the same. The preparation of the claimed compounds is illustrated schematically for a specific embodiment in Scheme A below, and more generally in Scheme B, to which the numerals in parentheses in the following description refer.

SCHEME A

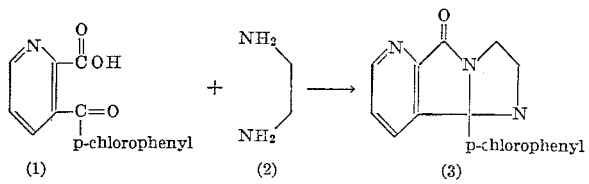

SCHEME B

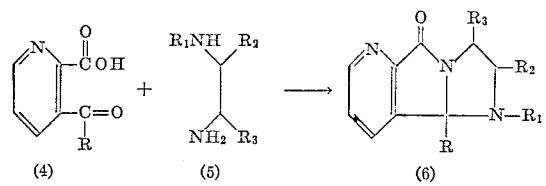

Some of the novel compounds of the present invention can be prepared by a general procedure which involves condensing a 3-benzoylpicolinic acid (1)(4) with a diamine (2)(5) to form the desired 9b-phenyl-1,2,3,9b-tetrahydro-5H-imidazo[1,2-a]pyrido[3,2-c]pyrrol-5-one. This condensation is effected by heating the reactants in an inert solvent, preferably toluene, while continuously removing the water of reaction as it forms.

It will be apparent to those skilled in the art of organic chemistry that the condensation reaction by which the claimed compounds are prepared can be carried out with any 3-aroylpicolinic acids which are substituted with non-interfering groups. More specifically, there can be attached in the 3-position, a carbonyl group which bears a substituent (Scheme B, R) which can be a halophenyl group, such as, for example, but without limitation, a p-chlorophenyl or a p-bromophenyl group or a (lower) alkylphenyl group in which the alkyl moiety ranges from methyl to hexyl or a lower alkoxy group ranging from methoxy to pentoxy. Similarly, substituent R can be a 2- or 3-thienyl group.

It will also be appreciated by those skilled in the art that the starting diamine compound can bear non-interfering substituents. Thus there can be on one of the amino groups a (lower)alkyl group (Scheme B, $R_1$), as above defined. Similarly, said compound can bear one or more (lower)alkyl groups on the alkylene moiety and when the alkylene moiety is other than ethylene, the compound can bear a hydroxy group ($R_2$, $R_3$) on the alkylene chain thereof.

When the starting compounds are substituted as hereinbefore indicated, it will be apparent to those skilled in the art that the final products will bear correspondingly the same substituents. Such substituted compounds are the full equivalents of the invention as particularly claimed.

From the aforesaid it will be apparent to those skilled in the art that the condensation reaction whereby the compounds of this invention are prepared can be carried out with various diamine compounds. Thus, for example but without limitation, the previously described 3-benzoylpicolinic acids can be reacted with a diaminopropane to form a 1,2,3,4,6,10b-hexahydropyrimido[1,2-a]pyrido[3,2-c]pyrrol-6(2H)-one of the formula:

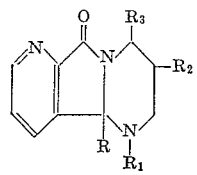

wherein R, $R_1$, $R_2$ and $R_3$ are defined as above. Further, these 3-benzoylpicolinic acids can be reacted with an o-phenylenediamine, as hereinafter illustrated, to form the corresponding 4b,5-dihydro-11H-pyrido[3′,2′:3,4]pyrrolo[1,2-a]benzimidazol-11-one:

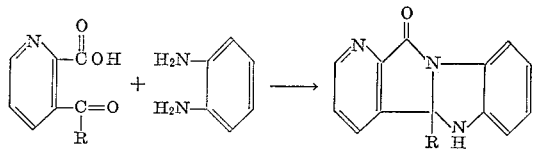

where R is as above. It should be noted that these pyridopyrrolobenzimidazolones can have various substituents added to their benzenoid moiety. For example, but without limitation, there can be on any convenient position on the benzenoid moiety of said structures one or more non-interfering substituents including lower alkyl, as above defined; halogen, preferably, chlorine or bromine, halo(lower)alkyl, preferably, trifluoromethyl and dichlormethyl; sulfamyl and alkylsulfamyl. The toxicities and the asserted activities of the compositions so modified are not materially affected by the presence of such substituents.

The 3-benzoylpicolinic acids and the diamines employed as starting materials to prepare the compounds of this invention are generally known or are readily prepared by procedures known to those skilled in the art.

The imidazopyridopyrrolones, pyrimidopyridopyrrolones and pyridopyrrolobenzimidazolones of the present invention have been found to possess interesting pharmaceutical properties which render them useful as synthetic medicinals. More particularly, these compounds, in standard pharmacological tests have exhibited mydriatic, anticonvulsant and analgesic activities.

When the compounds of this invention are employed as mydriatics, anticonvulsants and analgesics, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 20 mg. to about 200 mg. per day is most desirably employed in order to achieve effective results.

The following examples are given by way of illustration and are not to be construed as limitations of this invention, many variations of which are possible without departing from the scope and spirit thereof.

*Example I*

Reflux nine grams of 3-(p-chlorobenzoyl)picolinic acid 25 ml. of ethylenediamine, and 100 ml. of toluene for 5 hours in a flask equipped with a water separator. Evaporate the solution to a solid residue. Recrystallize from ethanol to obtain 9b-(p-chlorophenyl)-1,2,3,9b-tetrahydro - 5H-imidazo[1,2-a]pyrido[3,2-c]pyrrol-5-one, M.P. 229° C.

The above-prepared compound was tested and found to exhibit results qualitatively indicating its effectiveness for the uses hereinbefore asserted.

*Example II*

Reflux thirteen grams of 3-(p-chlorobenzoyl)picolinic acid, 20 ml. of 2,3-diaminobutane, and 75 ml. of toluene for 6 hours in a flask equipped with a water separator. Cool the solution and remove the precipitated solid by filtration. Recrystallize from ethanol to obtain 9b-(p-chlorophenyl) - 2,3 - dimethyl - 1,2,3,9b - tetrahydro-5H-imidazo[1,2-a]pyrido[3,2-c]pyrrol-5-one, M.P. 250–2° C.

*Example III*

When the procedures of Examples I and II are repeated employing the appropriate starting materials, the following imidazopyridopyrrolones are prepared:

9b-(o-bromophenyl)-1,2,3,9b-tetrahydro-5H-imidazo [1,2-a]pyrido[3,2-c]pyrrol-5-one;
9b-phenyl-3-propyl-1,2,3,9b-tetrahydro-5H-imidazo [1,2-a]pyrido[3,2-c]pyrrol-5-one;
9b-(2-thienyl)-1,2,3,9b-tetrahydro-5H-imidazo[1,2-a] pyrido[3,2-c]pyrrol-5-one;
9b-(p-chlorophenyl)-1-ethyl-1,2,3,9b-tetrahydro-5H-imidazo[1,2-a]pyrido[3,2-c]pyrrol-5-one; and
9b-(p-methoxyphenyl)-1,2,3,9b-tetrahydro-5H-imidazo [1,2-a]pyrido[3,2-c]pyrrol-5-one.

*Example IV*

Reflux nine grams of 3-(p-chlorobenzoyl)picolinic acid, 15 ml. of 1,3-diaminopropane, and 100 ml. of toluene for 6 hours in a flask equipped with a water separator. Cool the solution and remove the precipitated solid by filtration. Recrystallize from ethanol to obtain 10b-(p-chlorophenyl) - 1,2,3,4,6,10b - hexahydropyrimido[1,2-a] pyrido[3,2-c]pyrrol-6(2H)-one, M.P. 248° C.

In a similar manner, the following compounds were prepared:

10b-phenyl-1-propyl-1,2,3,4,6,10b-hexahydropyrimido [1,2-a]pyrido[3,2-c]pyrrol-6(2H)-one;
10b-(p-propoxyphenyl)-1,2,3,4,6,10b-hexahydropyrimido [1,2-a]pyrido[3,2-c]pyrrol-6(2H)-one; and
10b-(p-tolyl)-1,2,3,4,6,10b-hexahydropyrimido[1,2-a] pyrido[3,2-c]pyrrol-6(2H)-one.

*Example V*

Reflux ten grams of 3-(p-chlorobenzoyl)picolinic acid, 15 ml. of 1,3-diamino-2-hydroxypropane and 100 ml. of toluene for 6 hours in a flask equipped with a water separator. Evaporate the solution to a solid residue. Recrystallize from ethanol to obtain 10b-(p-chlorophenyl)-3-hydroxy - 1,2,3,4,6,10b - hexahydropyrimido[1,2-a] pyrido[3,2-c]pyrrol-6(2H)-one, M.P. 251–3° C.

Similarly, by reacting 3-(p-propylbenzoyl)picolinic acid with 1,3-diamino-2-hydroxypropane, there is prepared 3-hydroxy - 10b - (p - propylphenyl) - 1,2,3,4,6,10b-hexahydropyrimido[1,2 - a]pyrido[3,2 - c]pyrrol - 6(2H)-one.

*Example VI*

Reflux ten grams of 3-(p-chlorobenzoyl)picolinic acid, 6 g. of o-phenylenediamine, and 100 ml. of toluene for 6 hours in a flask equipped with a water separator. Cool the solution and remove the precipitated solid by filtration. Recrystallize from ethanol to obtain 4b-(p-chlorophenyl) - 4b,5 - dihydro - 11H - pyrido[3',2':3,4]pyrrolo [1,2-a]benzimidazol-11-one, M.P. 257° C.

*Example VII*

The following pyridopyrrolobenzimidazolones are prepared according to the procedure of Example VI employing the corresponding 3-benzoyl picolinic acid and substituted o-phenylenediamine as starting materials:

7-chloro-4b-phenyl-4b,5-dihydro-11H-pyrido[3',2':3,4] pyrrolo[1,2-a]benzimidazol-11-one;
8-trifluoromethyl-4b-(p-tolyl)-4b,5-dihydro-11H-pyrido [3',2':3,4]pyrrolo[1,2-a]benzimidazol-11-one;
8-bromo-4b(3-thienyl)-4b,5-dihydro-11H-pyrido[3',2': 3,4]pyrrolo[1,2-a]benzimidazol-11-one;
4b-(p-chlorophenyl)-7-sulfamyl-4b,5-dihydro-11H-pyrido [3',2':3,4]pyrrolo[1,2-a]benzimidazol-11-one;
8-methylsulfamyl-4b-phenyl-4b,5-dihydro-11H-pyrido [3',2':3,4]pyrrolo[1,2-a]benzimidazol-11-one; and
4b-(p-bromophenyl)-8-propylsulfamyl-4b,5-dihydro-11H-pyrido[3',2':3,4]pyrrolo[1,2-a]benzimidazol-11-one.

What is claimed is:

1. A compound selected from the group consisting of those having the formulae:

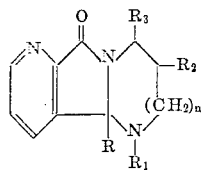

and

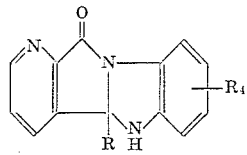

wherein R is selected from the group consisting of phenyl, thienyl, halophenyl, (lower)alkylphenyl and (lower)alkoxyphenyl; $R_1$ is selected from the group consisting of hydrogen and lower alkyl; $R_2$ and $R_3$ are selected from the group consisting of hydrogen and (lower)alkyl, with the proviso that when $n$ is 1 $R_2$ may also be hydroxy; $R_4$ is selected from the group consisting of halogen, halo(lower)alkyl, sulfamyl and (lower)alkylsulfamyl; and $n$ has a value of from 0 to 1.

2. A compound as described in claim 1 which is: 9b-(p - chlorophenyl) - 1,2,3,9b - tetrahydro - 5H - imidazo[1,2-a]pyrido[3,2-c]pyrrol-5-one.

3. A compound as described in claim 1 which is: 9b-(p - chlorophenyl) - 2,3 - dimethyl - 1,2,3,9b - tetrahydro-5H-imidazo[1,2-a]pyrido[3,2-c]pyrrol-5-one.

4. A compound as described in claim 1 which is: 10b-(p - chlorophenyl) - 1,2,3,4,6,10b - hexahydropyrimido[1,2-a]pyrido[3,2-c]pyrrol-6-(2H)-one.

5. A compound as described in claim 1 which is: 4b-(p - chlorophenyl) - 4b,5 - dihydro-11H-pyrido[3',2':3,4]pyrrolo[1,2-a]benzimidazol-11-one.

6. A compound as described in claim 1 which is: 10b-(p - chlorophenyl) - 3 - hydroxy-1,2,3,4,6,10b-hexahydropyrimido[1,2-a]pyrido[3,2-c]pyrrol-6-(2H)-one.

7. A compound as described in claim 1 which is: 9b-(o - bromophenyl) - 1,2,3,9b - tetrahydro - 5H - imidazo[1,2-a]pyrido[3,2-c]pyrrol-5-one.

8. A compound as described in claim 1 which is: 10b-(p - tolyl)-1,2,3,4,6,10b-hexahydropyrimido[1,2-a]pyrido[3,2-c]pyrrol-6-(2H)-one.

9. A compound as described in claim 1 which is: 7-chloro - 4b - phenyl - 4b,5-dihydro-11H-pyrido[3',2':3,4]pyrrolo[1,2-a]benzimidazol-11-one.

10. A compound as described in claim 1 which is: 9b-(p - methoxyphenyl) - 1,2,3,9b - tetrahydro - 5H-imidazo[1,2-a]pyrido[3,2-c]pyrrol-5-one.

No references cited.

ALEX MAZEL, *Primary Examiner.*

M. O'BRIEN, *Assistant Examiner.*